United States Patent [19]
Mazur et al.

[11] Patent Number: 6,072,792
[45] Date of Patent: Jun. 6, 2000

[54] POWER CONTROL APPARATUS, AND AN ASSOCIATED METHOD, FOR TDMA TRANSMITTER

[75] Inventors: Sara Mazur, Bromma; Bo Hagerman, Stockholm; Thomas Östman, Spånga, all of Sweden

[73] Assignee: Telefonaktiebolaget LM Ericsson, Stockholm, Sweden

[21] Appl. No.: 08/887,726

[22] Filed: Jul. 3, 1997

[51] Int. Cl.[7] .......................... H04B 7/212; H04B 7/185; H04B 7/00
[52] U.S. Cl. ...................... 370/345; 370/442; 455/70
[58] Field of Search .................... 370/330, 337, 370/442, 528, 200, 201, 252, 335; 455/88, 69, 522, 54, 70

[56] References Cited

U.S. PATENT DOCUMENTS

| | | | |
|---|---|---|---|
| 5,333,175 | 7/1994 | Ariyavisitakul et al. | 379/58 |
| 5,539,728 | 7/1996 | Gaiani et al. | 370/18 |
| 5,604,730 | 2/1997 | Tiedemann, Jr. | 370/252 |
| 5,710,982 | 1/1998 | Laborde et al. | 455/69 |
| 5,722,051 | 2/1998 | Agrawal et al. | 455/69 |
| 5,740,165 | 4/1998 | Vannucci | 370/330 |
| 5,839,056 | 11/1998 | Hakkinen | 455/69 |

FOREIGN PATENT DOCUMENTS

| | | | |
|---|---|---|---|
| 9312590 | 6/1993 | WIPO | H04B 7/26 |
| 9517048 | 6/1995 | WIPO | H04B 1/713 |

*Primary Examiner*—Huy D. Vu
*Assistant Examiner*—M. Phan
*Attorney, Agent, or Firm*—Jenkens & Gilchrist, PC

[57] ABSTRACT

Power control apparatus and an associated method for a transmitting station operable in a TDMA communication system. The transmitting station includes transmitter branches for communicating communication signal bursts during selected time slots. Communication signal bursts transmitted upon adjacent time slots partially overlap so that a receiving station is able to extract information from a communication signal burst transmitted upon an adjacent time slot.

45 Claims, 7 Drawing Sheets

POWER CONTROL APPARATUS, AND AN ASSOCIATED METHOD, FOR TDMA TRANSMITTER

CROSS-REFERENCE TO RELATED APPLICATIONS

The present invention is related to co-pending application Ser. No. 08/787,758 filed on Jan. 28, 1997, the contents of which are incorporated by reference herein.

The present invention relates generally to a TDMA (time-division, multiple-access) radio communication system. More particularly, the present invention relates to power control apparatus, and an associated method, for controlling power levels of bursts of communication signals communicated during selected time slots defined in the TDMA communication system.

By controlling the power levels at which the bursts are communicated, interference caused by the communication of such bursts can be reduced. With reduced levels of interference, performance of the communication system can be improved, such as by increasing system capacity or communication quality.

The bursts are communicated in manners which also permit receiving stations to extract information from communication signal bursts communicated during adjacent time slots. Viz, a receiving station, active to receive a communication signal burst during one time slot is able also to extract information from signal bursts communicated during adjacent time slots.

Transmitter diversity is used to transmit bursts of communication signals from at least two transmitter branches of a transmitting station. The communication signal bursts transmitted by the transmitter branches during adjacent time slots partially overlap in time. A receiving station is thereby able to extract information of a communication signal burst transmitted during a time slot adjacent to a time slot upon which a communication signal burst is transmitted to the receiving station.

When implemented, for instance, in a cellular communication system, operation of an embodiment of the present invention provides power control on a time slot-by-time slot basis while also providing a manner to permit a receiving station to extract information from signals transmitted to other receiving stations.

Implementation of an embodiment of the present invention is therefore advantageous, for instance, in cellular communication systems constructed to comply with the operational specifications of the EIA/TIA IS-136 Standard, the PDC (Pacific Digital Cellular) Standard, and to provide GPRS (General Packet Radio Service) for GSM (General System for Mobile communications) Standard. Each of such systems require that a mobile terminal operable therein be able to extract information from signals transmitted to other mobile terminals.

BACKGROUND OF THE INVENTION

Advancements in communication technologies have permitted the creation and implementation of digital communication systems of improved performance. A digital cellular communication system, such as one constructed according to one of the aforementioned Standards, is exemplary of a communication system having improved performance characteristics relative to conventional analog systems.

In such a TDMA (time-division, multiple-access) system, carrier frequencies (hereinafter referred to as "carriers") of a frequency band allocated to such communication systems are divided into time slots. Groups of time slots together form frames. Time slot-carrier combinations define channels upon which bursts of communication signals are transmitted to mobile terminals. Because a plurality of channels are defined upon a single carrier, separate communications can be effectuated with a plurality of mobile stations on a single carrier. Communication signal bursts transmitted by a radio base station are referred to as downlink bursts. And communication signal bursts transmitted by a mobile terminal to a radio base station are referred to as uplink bursts.

A cellular communication system typically makes relatively efficient use of the frequency band allocated thereto. Typically, relatively low-power signals are transmitted. Because relatively low-power signals are transmitted at the same frequencies throughout the geographical areas encompassed by such systems, the same frequencies can be reused. Frequency planning procedures are used to allocate carriers to different cells of the system so that the carriers can be reused in different ones of the cells, but in manners so that co-channel interference do not disrupt communications.

However, as usage of cellular communication systems increases, there is a continuing need to find manners by which to utilize even more efficiently the frequency bands allocated thereto.

Various proposals have been set forth to yet more efficiently utilize the frequency bands allocated for cellular communications. By more efficiently utilizing the frequencies allocated to cellular communications, the communication capacity of the system can be increased at improved signal quality levels.

The aforementioned co-pending patent application, application Ser. No. 08/787,758 discloses, inter alia, the usage of antenna apparatus capable of generating directional antenna beam patterns. Utilization of directional antenna beam patterns to effectuate communications permits separate communications within a single cell to be effectuated concurrently during a single time slot. Formation of directional antenna beam patterns is a form of spatial power control. That is to say, signal power levels of signal bursts broadcast throughout an area encompassed by an antenna beam pattern are significantly attenuated beyond the area encompassed by the antenna beam pattern.

Temporal power control similarly can be used to increase the communication capacity of a cellular communication system. Use of either of such forms of power control permits an increase in the communication capacity of a cellular communication system. Temporal power control refers to the control of the power levels at which communication signal bursts are transmitted. By minimizing the power levels at which communication signal bursts are transmitted, interference caused by the transmission of such communication signal bursts can be minimized.

In some existing cellular communication systems, provision is made for control of the power levels of uplink bursts generated by mobile terminals. But, control of the power levels of downlink bursts is limited. Such limitation is usually caused by requirements that a mobile terminal make use of downlink bursts transmitted on time slots adjacent to the time slot upon which the mobile terminal is to receive a downlink burst.

Adjacent slot information is used generally for purposes of receiver-circuitry, complexity reduction and to facilitate the tracking and synchronizing of a mobile terminal. Such requirements limit the amounts by which control can be exerted over the power levels of downlink bursts transmitted in systems which comply with the IS-136, PDC, and GPRS in GSM Standards. In an existing GSM communication system, downlink power control on a per-slot basis can be applied. In an existing PDC cellular communication system, downlink power control of up to 8 dB between adjacent time slots is permitted. And, in an existing IS-136 system, downlink transmission power levels must be kept at a constant level during a frame when a time slot is active. Requirements related to downlink transmission power levels in the IS-136 system are set forth, inter alia, in Section 3.1.2 of the published version of the IS-136.2-A Standard.

In a mobile terminal operable in an IS-136 system, the mobile terminal uses training sequences included in adjacent time slots for purposes of synchronization and for aiding demodulation. As noted above, presently, the power levels of a downlink transmission must be kept at a constant level if any of the slots defined upon a carrier is active. Hence, no downlink power control on a time slot basis is permitted in an IS-136 system.

In a mobile terminal operable in a PDC communication system, the mobile terminal measures the receive signal strength levels in adjacent slots for purposes of diversity antenna selection. A maximum power reduction of −8 dB relative to the power levels in an active slot is permitted in non-active time slots defined in the PDC communication system.

In a mobile terminal operable to provide GPRS in a GSM communication system, the mobile terminal reads the uplink state flag transmitted in a downlink transmission to be able to determine if the mobile terminal is assigned to use a subsequent uplink time slot for transmission. So, the amount by which power levels of the downlink transmissions can be altered is limited.

If downlink temporal or spatial power control were to be introduced on a per-time slot, time-scale system, performance degradation in systems constructed to be in compliance with any of these three Standards would occur. By exerting better control over the power levels at which the downlink bursts are transmitted, the performance of the communication system can be improved.

A manner by which to provide downlink power control in a TDMA communication system on a time slot-by-time slot basis while also providing a manner to permit a receiving station to extract information from signals transmitted to other receiving stations would therefore be advantageous.

It is in light of this background information related to TDMA communication systems that the significant improvements of the present invention have evolved.

SUMMARY OF THE INVENTION

The present invention, accordingly, advantageously provides apparatus, and an associated method, for controlling power levels of bursts of communication signals communicated during selected time slots defined in a TDMA communication system.

The power levels of the bursts are controlled in manners which also permit receiving stations to extract information from communication signal bursts communicated during adjacent time slots. An embodiment of the present invention can therefore be implemented in a communication system in which the receiving station must be able to extract information from signal bursts communicated during adjacent time slots, i.e., adjacent to the time slot at which a communication signal burst is normally transmitted to the receiving station.

Appropriate temporal or spatial control of the power levels at which the bursts are communicated permits the levels of interference caused by the communication of such bursts to be reduced. By reducing the levels of interference caused by the transmission of such bursts, performance of the communication system can be improved. For example, the system capacity can be increased, or the communication quality of communications in the system can be improved.

In one aspect of the present invention, a transmitting station used to transmit the bursts of communication signals utilizes transmitter diversity such that bursts of communication signals are transmitted from at least two transmitter branches of the transmitting station. The communication signal bursts transmitted by the transmitter branches during adjacent time slots partially overlap in time. A receiving station, active to receive a burst of a communication signal during one time slot, is able thereby to extract information of a communication signal burst transmitted during an adjacent time slot due to the partial overlap.

An embodiment of the present invention can be advantageously implemented in a cellular communication system in which mobile terminals operable therein must be able to extract information from signals transmitted upon adjacent time slots. Cellular communication systems constructed to comply with the operational specifications of the EIA/TIA IS-136 Standard, the PDC (Pacific Digital Cellular) Standard, and to provide GPRS (General Packet Radio Service) for the GSM (General System for Mobile Communications) Standard are exemplary of such cellular communication systems.

When spatial downlink power control is utilized, beam forming apparatus is used at a transmitting station to form antenna beam patterns which partially overlap for a portion of a time slot. And, when temporal power control is utilized, power levels of communication signal bursts transmitted by different branches partially overlap for at least portions of a time slot. Combinations of temporal and spatial power control can also be utilized. Thereby, power control can be provided on a time slot-by-time slot basis while also ensuring that adjacent slot information can be extracted by a receiving station.

In these and other aspects, therefore, power control apparatus, and an associated method, is disclosed. Such apparatus and method is embodied at a transmitting station operable in a TDMA communication system at least to communicate a first communication signal burst to a first remote station during a first time slot, and at least a second communication signal burst to at least a second remote station during at least a second time slot. The power levels at which the first communication signal bursts and the at least the second communication signal burst are communicated are selectively controlled. A first transmitter branch is coupled to receive one of the first communication signal bursts and the at least the second communication signal burst. The first transmitter branch transmits the signal burst received thereat at a first selected power level. At least a second transmitter branch is coupled to receive at least one of the first communication signal bursts and the at least the second communication burst. The second transmitter branch transmits the communication signal burst received thereat at a second selected power level. The communication signal burst transmitted by the second transmitter branch is transmitted for at least a portion of a time slot other than the time slot during which the first transmitter branch transmits the signal burst received thereat.

A more complete appreciation of the present invention and the scope thereof can be obtained from the accompanying drawings which are briefly summarized below, the

DETAILED DESCRIPTION

Figure 1:
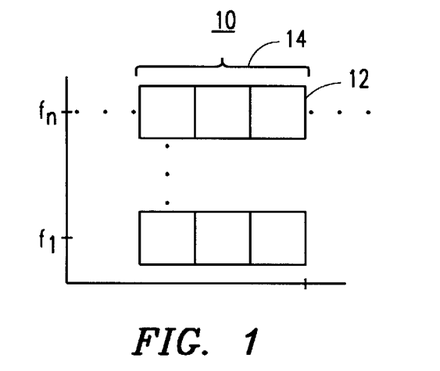
FIG. 1 illustrates an exemplary TDMA communication scheme in which groups of time slots defined upon carriers form channels upon which bursts of communication signals can be transmitted to effectuate communications between communication stations of a communication system.

Referring first to FIG. 1, an exemplary TDMA (time-division, multiple-access) communication scheme, shown generally at 10, is defined upon a frequency band allocated for communications by a communication system. Carriers located at selected intervals and here designated by $f_1 \ldots f_n$, are each divided into a plurality of time slots of selected time periods.

Groups of the time slots 12 on each of the carriers $f_1$–$f_n$ are formatted into frames 14. The frames illustrated in the exemplary communication scheme 10 shown in FIG. 1 are each formed of three time slots 12. For purposes of simplicity, only enough time slots to form a single frame 14 is shown upon each carrier $f_1$–$f_n$. In an actual implementation, successive frames, each formed of a plurality of time slots are defined upon each of the carriers $f_1$–$f_n$. In a TDMA communication scheme such as the scheme 10, channels are formed of time slot-carrier combinations. Communication signal bursts are transmitted upon time slot-carrier combinations which define such channels.

When circuit-switched data is transmitted, the communication signal bursts which together form such data are typically, but not necessarily, transmitted upon adjacent groups of frames. When GPRS is transmitted, bursts of signals which form such data are asynchronously transmitted. Once received at a receiving station, the communication signal bursts are concatenated together to permit recreation of the informational content of the signal bursts transmitted by the transmitting station.

In several existing cellular communication systems, such as the GSM communication system, a first set of carriers is allocated for downlink bursts. Separate channels are allocated for the transmission of the communication signal bursts to different ones of the mobile terminals. And, a separate set of carriers is allocated for uplink transmissions generated by mobile terminals for communication to a radio base station.

As noted previously, there is a continuing need to increase the efficiency by which the frequency band allocated to a communication system is utilized. Selectively controlling, on a time slot-by-time slot basis the power levels at which downlink bursts are transmitted in a cellular communication system would facilitate more efficient utilization of the allocated bandwidth. However, in at least several of the aforementioned existing systems, mobile terminals must be able to extract adjacent slot information to be properly operable. Amounts of power level variation or other control which can be exerted upon downlink communication bursts is limited.

Operation of an embodiment of the present invention provides a manner by which better to control the power levels of downlink communication bursts while still permitting a mobile terminal to extract adjacent slot information.

Figure 2:
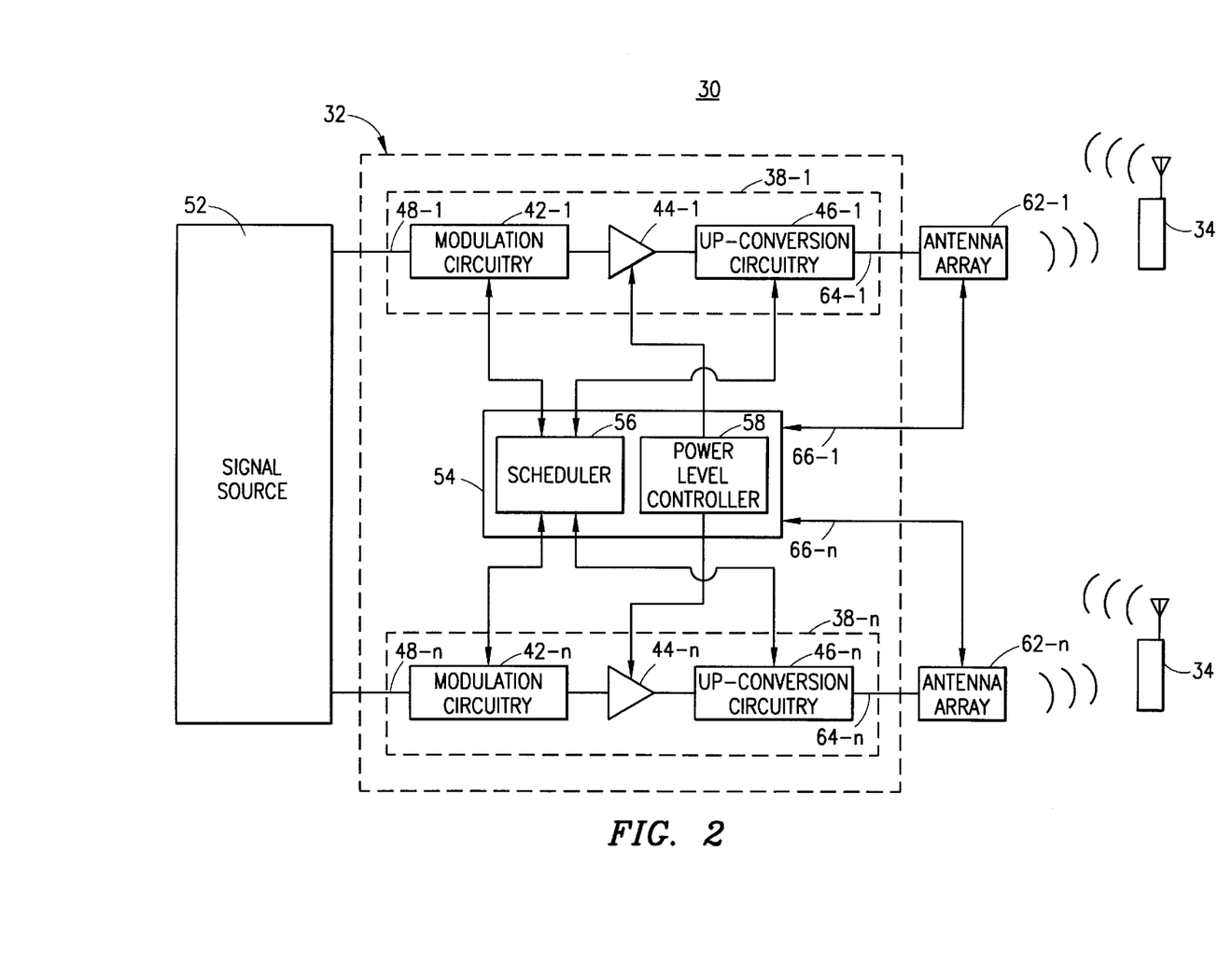
FIG. 2 illustrates a functional block diagram of a communication system including a transmitting station of an embodiment of the present invention.

FIG. 2 illustrates a communication system, shown generally at 30, here illustrated to be formed of a transmitting station 32 and a plurality of remote communication stations 34. The communication system 30 is exemplary of a portion of a cellular communication system in which the transmitting station 32 forms a portion of a cellular radio base station, and the remote communication stations 34 form mobile terminals operable in a cellular communication system.

When forming a portion of a radio base station of a cellular communication system, the transmitting station 32 is operable to transmit communication signal bursts upon channels defined by time slot-carrier combinations, such as those shown in the illustration of FIG. 1. The transmitting station 32 is further operable, however, in a manner to permit a mobile terminal 34 to extract adjacent-slot information from communication signal bursts transmitted upon channels defined by time slots adjacent to the time slots defining channels upon which communication signal bursts are transmitted to a particular mobile terminal.

The transmitting station 32 includes a plurality of transmitter branches 38. The exemplary embodiment shown in FIG. 2 illustrates two of the n possible transmitter branches 38, i.e., transmitter branches 38-1 and 38-n, of which the transmitting station 32 might be formed. Each transmitter branch 38 includes transmitter circuitry, here shown to include modulation circuitry 42, amplifier circuitry 44, and up-conversion circuity 46. E.g., the transmitter branch 38-1 includes modulation circuitry 42-1, amplifier circuitry 44-1, and up-conversion circuitry 46-1. And, the transmitter branch 38-n includes modulation circuitry 42-n, amplifier circuitry 44-n, and up-conversion circuitry 46-n. The transmitter branches 38 are each coupled to receive communication signals by way of lines 48. E.g., the transmitter branch 38-1 receives communication signals on the line 48-1 and the transmitter branch 38-n receives communication signals on the line 48-n. The communication signals are here represented to be generated by a signal source 52. When the transmitting station 32 forms a portion of a radio base station, the signal source 52 may, for example, be formed of a PSTN (public switched telephonic network) wherein the communication signal is generated on the lines 48 form the signals to be communicated to selected mobile terminals 34.

The transmitting station 32 further includes control circuitry 54 for controlling operation of the transmitter branches 38. The control circuitry 54 is here shown to include a scheduler 56 and a power level controller 58. The scheduler is operable to schedule communication of selected communication signal bursts of the communication signals generated on the lines 48 during selected time slots on selected carriers, together forming channels, to selected mobile terminals 34. And, the power level controller 58 is operable to control the power levels at which the communication signal bursts are transmitted by the respective transmitter branches 38.

The scheduler 56 is shown to be coupled to the modulation and up-conversion circuitry 42 and 46 of the respective transmitter branches 38 and also to the signal source 52. The scheduler 56 thereby controls the time slots and carriers upon which selected communication signal bursts are transmitted. And, the power level controller 58 is coupled to the amplifier circuitry 44 of the transmitter branches 38 to control the gain of the amplifiers and, hence, the power levels at which communication signal bursts are transmitted by the respective transmitter branches 38.

In the exemplary embodiment, an antenna array 62 is coupled to each of the antenna branches 38 by way of lines 64. E.g., an antenna array 62-1 is coupled to the transmitter branch 38-1 by way of the line 64-1 and an antenna array 62-n is coupled to the transmitter branch 38-n by way of the line 64-n. In the exemplary embodiment, the antenna arrays 62 are adaptively controlled by the control circuitry 54 to which the antenna arrays 62 are coupled, by way of the lines 66, i.e., lines 66-1 through 66-n, respectively. In other embodiments, the antenna arrays 62 form fixed antenna patterns. And, in one embodiment, a single antenna array or other antenna device is coupled to more than one transmitter branch 38.

The control circuitry 54 is thereby operable to control the channels upon which communication signal bursts are transmitted and the areas, by suitable selection of the antenna beam patterns exhibited by the antenna arrays 62, throughout which the communication signal bursts are transmitted. Appropriate control over the selection of communication signal bursts and the times at which such bursts are transmitted by the respective transmitter branches permits operation of a transmitting station 32 forming a portion of the radio base station in a manner to permit a mobile terminal 34 to extract adjacent slot information to permit its operation required pursuant to one of the afore-mentioned Standards, e.g., IS-136, GPRS for GSM, and the PDC Cellular Standards.

Figure 3:
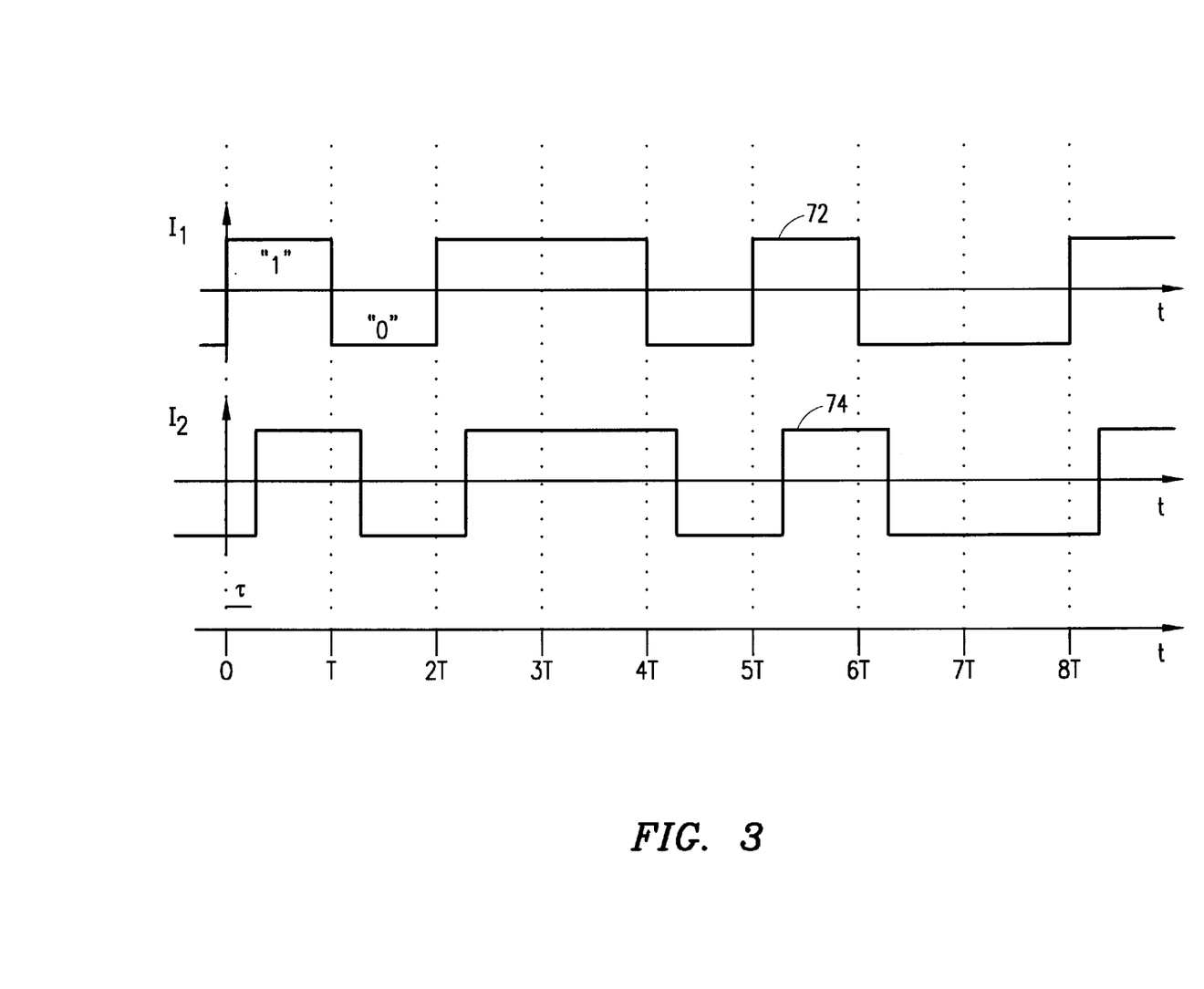
FIG. 3 illustrates a timing diagram showing the relative timing relationships between signals generated by two separate transmitter branches of the transmitting station shown in FIG. 2.

FIG. 3 illustrates the relative timing of portions of a communication signal burst during operation of an embodiment of the present invention. Here, two binary, antipodal modulated sequences 72 and 74 are plotted as functions of symbol time, T. The sequences 72 and 74 are generated by two of the transmitter branches 38 of the transmitting station 32 shown in FIG. 2. As the illustration indicates, the sequences 72 and 74 are substantially identical but for a phase offset, indicated by a delay time period of τ of a 0.25T time period. That is to say, with reference again to the transmitting station 32 shown in FIG. 2, the signal source 52 supplies the same communication signal bursts on lines 48 to two of the transmitter branches 38. The scheduler 56 of the control circuitry 54 is operable further to perform time scheduling, here to introduce the delay into the communication signal applied to one of the branches so that the sequences 72 and 74 transmitted by the transmitting station 32 are offset from one another. Such time delay of the same source data forming the respective sequences 72 and 74 creates transmitter diversity. The transmitter diversity created in this manner decorrolates the signals transmitted by the respective transmitter branches. A requirement for different fading patterns is that transmitter diversity be used in combination with polarization diversity or with spatial diversity. Therefore, the transmitter branches are typically transmitted using different antennas spaced-apart to create spatial diversity and/or different antennas with different polarization to create polarization diversity.

Figure 4:
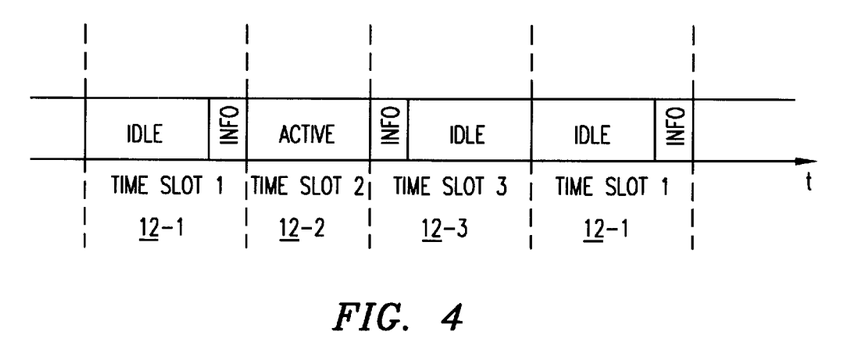
FIG. 4 illustrates state scheduling of a receiving station of the communication system shown in FIG. 2.

FIG. 4 illustrates a mobile state scheduling chart 78 indicating the states of a mobile terminal, or other remote communication station, tuned to a carrier upon which frames 14 (shown in FIG. 1) having three time slots 12, i.e., time slots 12-1, 12-2, and 12-3, formed thereupon. A mobile terminal 34 is caused to be in one of three states, an idle state, an active state, and an information state. When in an active state, a communication signal burst is intended to be transmitted by the transmitting station 32 to the mobile terminal. When in an information state, the mobile terminal 34 is operable to extract information from communication signal bursts communicated to other mobile terminals. And, when in the idle state, the mobile terminal is not operable to receive or to extract information from any communication signal burst.

As illustrated in the Figure, when in the active state, the mobile terminal 34 remains in such state for the entire period of a time slot, here the second time slot, "time slot 2", 12-2. The mobile terminal is in an information state for only portions of a time slot, here the first and third time slots, "time slot 1" 12-1 and "time slot 3", 12-3. In the embodiment illustrated in the Figure, during the first and third time slots, the mobile terminal enters the information state at the start-side and close to the end-side of the time slot. When in such state, signal energy of communication signal bursts intended to be transmitted to other mobile terminals are also detected by the mobile terminal which is to be active during the second time slot 12-2.

Figure 5:
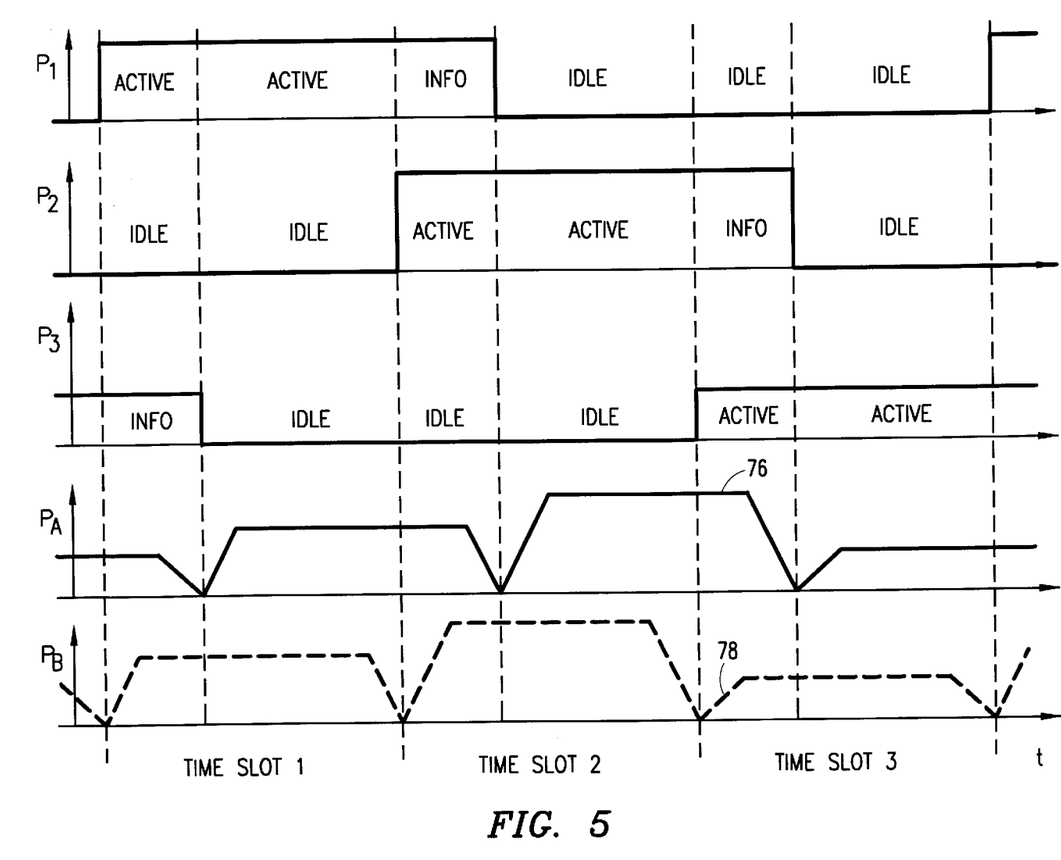
FIG. 5 illustrates a timing diagram showing downlink power scheduling by which communication signal bursts are transmitted by two of the transmitter branches of the communication system shown in FIG. 2.

FIG. 5 illustrates the power levels of communication signal bursts transmitted during three consecutive time slots 12, time slots 12-1, 12-2, and 12-3, by two transmitter branches 38 of the transmitting station 32 according to an embodiment of the present invention. The power level controller 58 of the control circuitry 54 (shown in FIG. 2) is operable to cause amplification by the amplification circuitry 44 of the respective transmitter branches 38 to be of one of three levels, indicated in the Figure by power levels $P_1$, $P_2$, and $P_3$. The respective power levels are caused to be generated by the respective transmitter branches 38 by appropriate control of the levels of amplification generated by the amplification circuitry 44 of the respective branches 38. The top three representations in the Figure illustrate that during the first time slot 12-1, a communication signal burst is to be generated at the power level $P_1$; during the second time slot 12-2, a communication signal burst is to be transmitted at the power level $P_2$; and, during the third time slot 12-3, a communication signal burst is to be transmitted at the power level $P_3$. Signal energy of power levels, as indicated in the Figure, are to be transmitted during not only the respective time slots 12, but also during the information state of a succeeding time slot.

Waveforms 76 and 78 are representative of the power levels of communication signal bursts generated by two of the transmitter branches 38. The waveforms 84 and 86 form time traces indicating the power levels at which the signals are transmitted by the respective branches. The same signals, formed of the same source data, are transmitted by different transmitter branches, but offset in time relative to one another. Transmission of signals with different power levels for time periods exceeding that of a single time slot 12 is thereby provided. The overlap of the signals transmitted by the different transmitter branches upon the adjacent time slots permits information to be extracted at the correct power level by a mobile terminal in an adjacent time slot. In other words, the same information is transmitted in one or more branches with individual power scheduling. The signal transmitted by each branch is also offset in time. The signals generated by various branches in one embodiment are transmitted from a single antenna. In other embodiments, separate antennas are utilized to create spatial diversity. The signals may also be transmitted by antennas exhibiting different polarization patterns. The antenna patterns may, e.g., be omnidirectional, sector-shaped, form fixed, narrow beams, or adaptively-formed by an antenna array. The waveforms 76 and 78 are similar to one another but for an offset of a time delay corresponding to the time period of the information state. Thereby, signal energy of the noted power levels is generated by at least one of the transmitter branches 38 for the time period corresponding to a time slot and an information state of a subsequent time slot. Thereby, a mobile terminal tuned to the channel to receive a communication signal burst during an allocated time slot 12 is able also to extract adjacent-slot information during the information state of a succeeding time slot 12.

The power levels at which the bursts are transmitted are ramped-up and down during the information states and the active states in the scheme shown in FIG. 5.

FIG. 6 again illustrates the three power levels, $P_1$, $P_2$, and $P_3$ during the time slots 12-1, 12-2, and 12-3, and succeeding information states, as illustrated. Waveforms 92 and 94 are representative of the power levels at which communication signal bursts are generated by two transmitter branches 38. The waveforms 92 and 94 of FIG. 6 differ from the corresponding waveforms 84 and 86 shown in FIG. 5 in that the communication signal bursts are not merely offset from one another. Rather, the signal energy levels of the communication signal bursts are separately scheduled by the scheduler 56 for each of the transmitter branches 38. Examination of the waveforms 92 and 94, however, indicate that the signal energy levels $P_1$, $P_2$, and $P_3$ are generated during the corresponding time slot and information state successive thereto.

Figure 6:
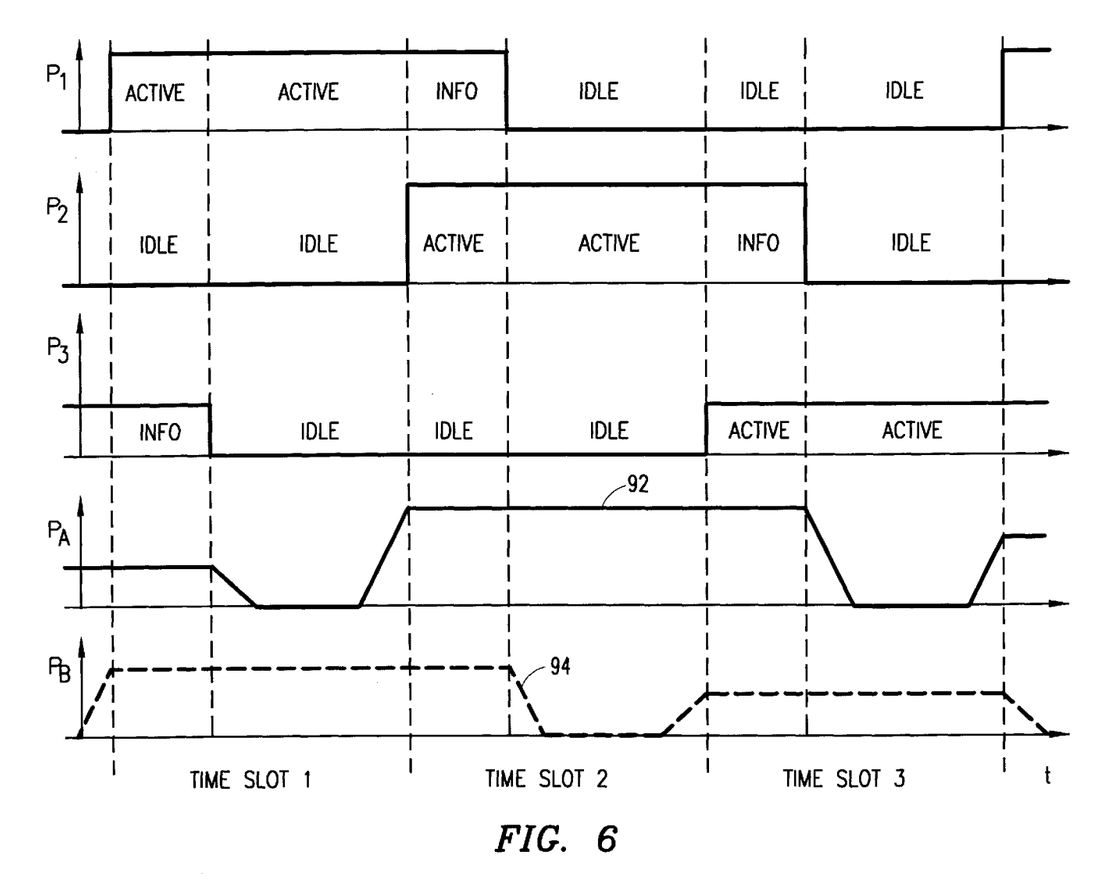
FIG. 6 illustrates a timing diagram, similar to that shown in FIG. 5, but which shown the power levels of the communication signal bursts transmitted by two transmitter branches according to another embodiment of the present invention.

In contrast to the embodiment shown in FIG. 5, in the embodiment of FIG. 6, the power levels of signals transmitted by the different branches are maintained at constant power levels during the information states.

Figure 7:
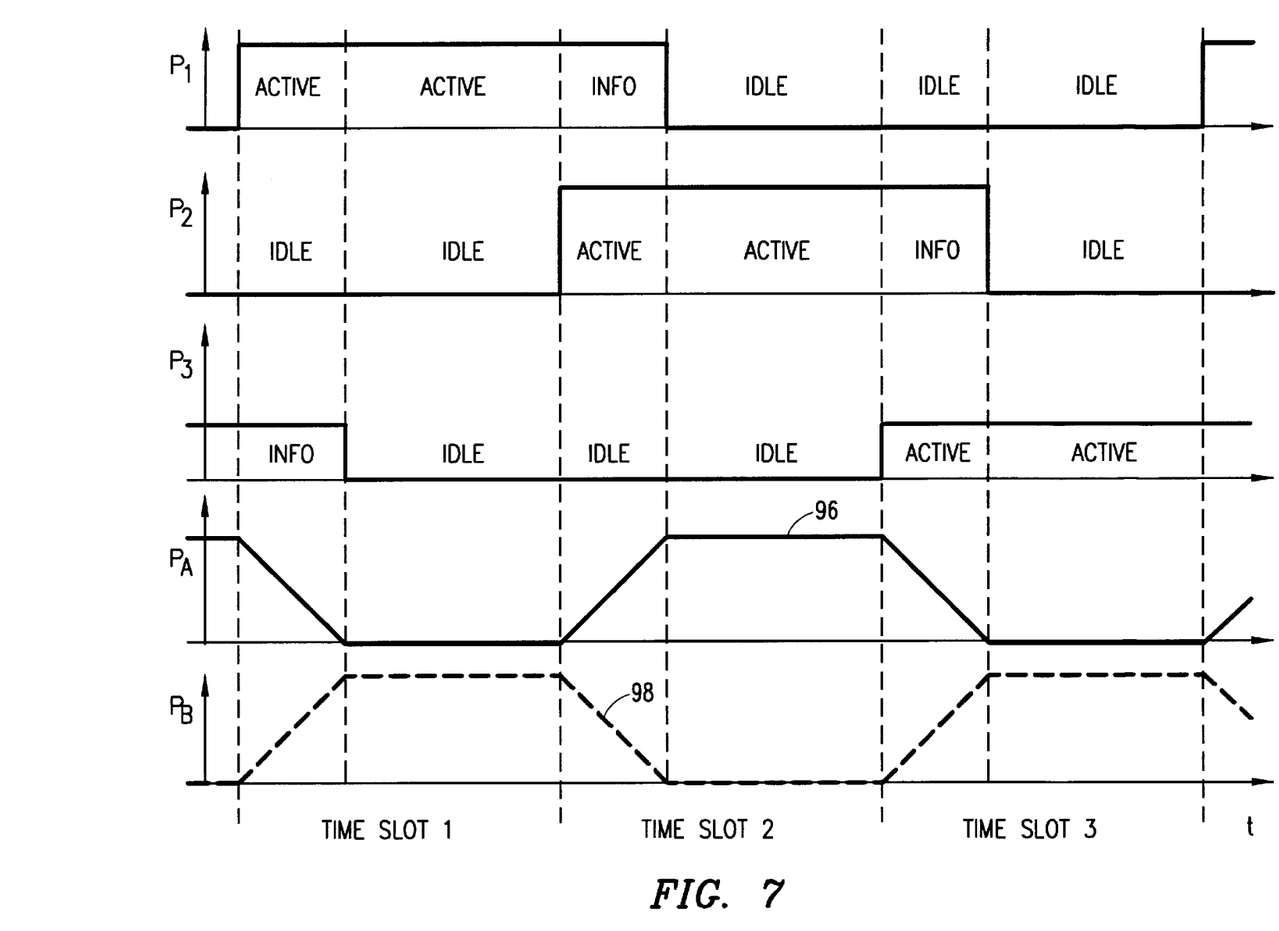
FIG. 7 illustrates another timing diagram, similar to those shown in FIGS. 5–6, but which illustrates the power levels of communication signal bursts transmitted by two transmitter branches of the communication system too according to another embodiment of the present invention.

FIG. 7 again illustrates the three power levels, $P_1$, $P_2$, and $P_3$ during the same time slots as those shown in FIGS. 5–6. Here, waveforms 96 and 98 of communication signal bursts generated by two transmitter branches 38. Here, the power scheduler 56 causes the communication signal bursts to be transmitted in a manner such that the combined power levels generated by the two transmitter branches 38 are of a constant value.

And, as noted previously, the signals transmitted by the various branches can each be generated by an antenna assembly capable of forming a fixed-omni-directional antenna beam pattern, a fixed sector antenna beam pattern, fixed narrow-lobe antenna beam patterns, and adaptive antenna beam patterns.

Figure 8:
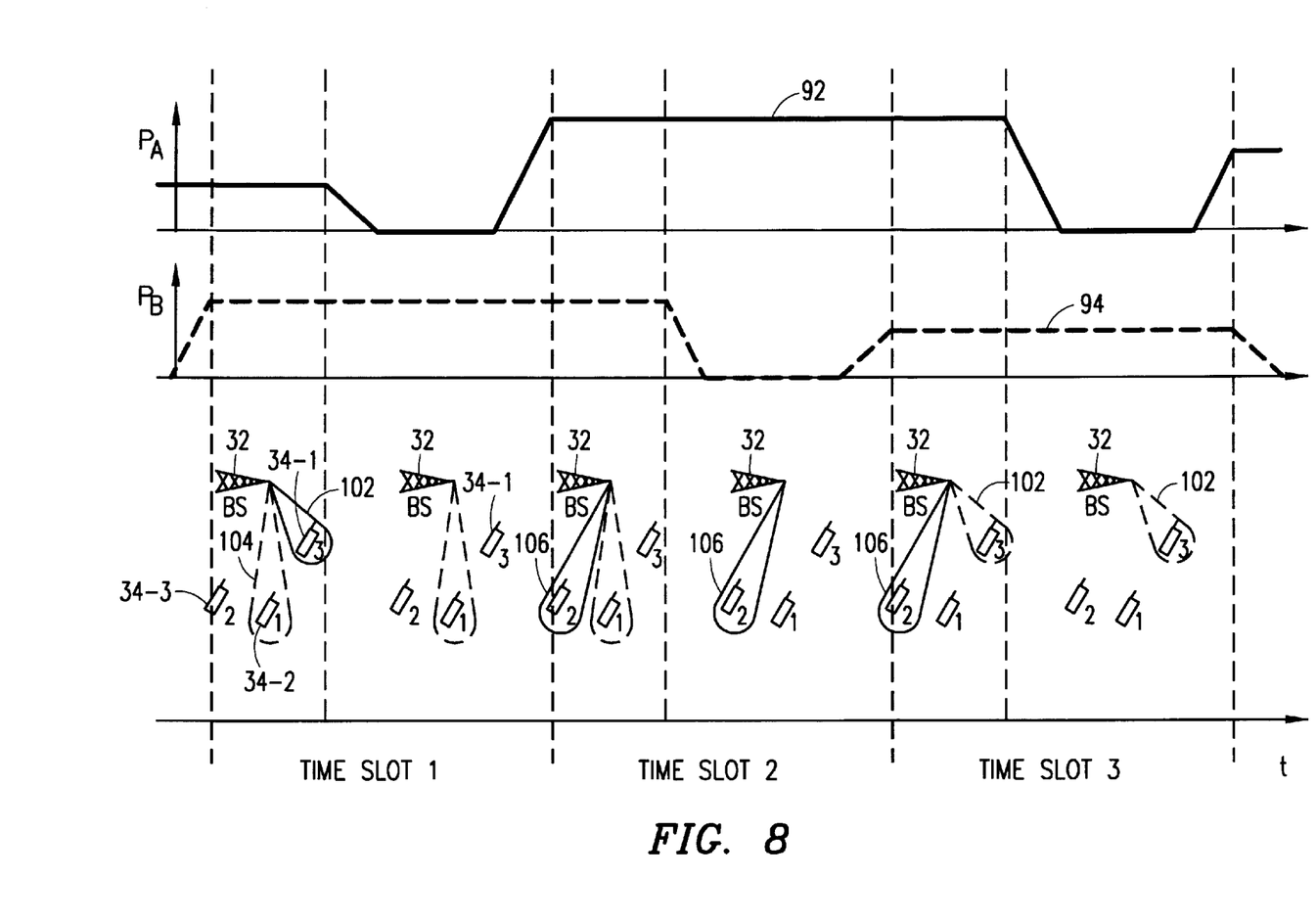
FIG. 8 illustrates operation of an embodiment of the transmitting station shown in FIG. 2 in which spatial power control is utilized.

FIG. 8 illustrates operation of an embodiment of the present invention in which beamforming is also provided. The top portion of the Figure illustrates the waveforms 92 and 94, shown previously in FIG. 6, generated by two transmitter branches 38. The bottom portion of the Figure illustrates a transmitting station 32 forming a radio base station and directional antenna beam patterns 102, 104, and 106 formed by antenna arrays 62 of transmitter branches 38 of the transmitting station during the various time slots 12 and the information states forming portions thereof.

During the information state portions of each of the time slots, two antenna beam patterns are formed while during remaining portions of each of the time slots 12 only a single antenna beam pattern is formed.

For instance, with respect to the first time slot 12-1, during the information state portion thereof, a communication signal burst is communicated pursuant to the antenna beam pattern 102 to the mobile terminal 34-1 and a communication signal burst is communicated pursuant to the antenna beam pattern 104 to the mobile terminal 34-2. The antenna beam pattern 102 is formed by an antenna assembly 62 coupled to the first transmitter branch, and the antenna beam pattern 104 is formed by an antenna assembly 62 coupled to the second transmitter branch 38.

During the information state portion of the second time slot 12-2, communication signal bursts are transmitted to both the mobile terminals 34-2 and 34-3. A communication signal burst is transmitted pursuant to the antenna beam pattern 104 by the second transmitter branch 38, and the communication signal burst is transmitted to the mobile terminal 34-3 pursuant to the antenna beam pattern 106 by the first transmitter branch 38. During remaining portions of the second time slot 12-2, only the communication signal burst transmitted pursuant to the antenna beam pattern 106 by the first antenna branch 38 is transmitted.

During the third time slot 12-3, communication signal bursts are communicated to the mobile terminals 34-1 and 34-3 by way of the antenna beam patterns 102 and 106, respectively. The communication signal burst is transmitted by the second transmitter branch 38, and the communication signal burst transmitted pursuant to the antenna beam pattern 106 is generated by the first transmitter branch 38. During remaining portions of the third time slot 12-3, the communication signal burst is transmitted to the mobile terminal 34-1 pursuant to the antenna beam pattern 102 formed by the antenna assembly 62 of the second transmitter branch 38.

During the first time slot 12-1, the mobile terminal 34-2 is in the active state for the entire duration of the time slot. During the second time slot 12-2, the mobile terminal 34-3 is in the active state for the entire period of the time slot, and during the third time slot 12, the mobile terminal 34-1 is in the active state for the duration of the entire time slot. The mobile terminal 34-2 is additionally active during the information state portion of the second time slot 12-2, the mobile terminal 34-3 is further active during the information state portion of the third time slot 12-3, and the mobile terminal 34-1 is additionally active during the information state portion of the first time slot 12-1.

Figure 9:
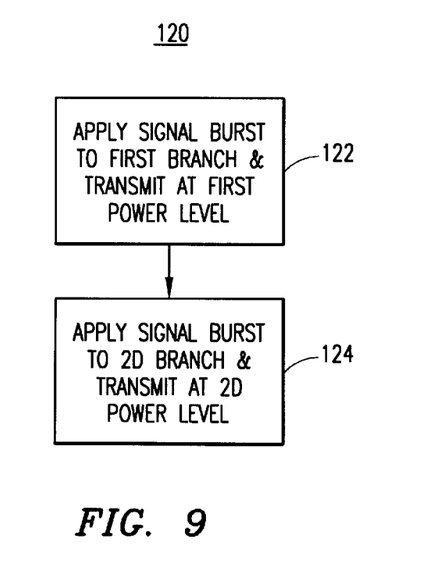
FIG. 9 illustrates a method flow diagram listing the method steps of the method of an embodiment of the present invention.

FIG. 9 illustrates a method flow diagram, shown generally at 120, listing the method steps of an embodiment of the present invention. The method 120 selectively controls power levels at which communication signal bursts are communicated by a transmitting station operable in a TDMA communication system. First, and as indicated by the block 122, a first transmitter branch is coupled to receive a communication signal burst at a first selected power level. Then, and as indicated by the block 124, at least a second transmitter branch is coupled to receive a communication signal burst. The communication signal burst transmitted by the second transmitter branch is transmitted for at least a portion of a time slot other than the time slot during which the first transmitter branch transmits the communication signal burst applied to that branch.

Operation of an embodiment of the present invention thereby provides a manner by which to control the power levels at which bursts of communication signals are communicated during operation of a TDMA communication system. Such control over the power levels permits a reduction in the levels of interference caused by the communication of such bursts. The bursts are further communicated in manners which also permit receiving stations to extract information from communication signal bursts communicated during adjacent time slots. Thereby, an embodiment of the present invention can be embodied in a cellular communication system in which a mobile terminal is required to be able to extract information from adjacent time slots.

The previous descriptions are of preferred examples for implementing the invention, and the scope of the invention should not necessarily be limited by this description. The scope of the present invention is defined by the following claims.

What is claimed is:

1. In a transmitting station operable in a TDMA communication system at least to communicate a first communication signal burst to a first remote station during a predetermined time slot, and at least a second communication signal burst to at least a second remote station during a predetermined time slot, an improvement of power control apparatus for selectively controlling power levels at which the first communication signal burst and the at least the second communication signal burst are communicated, said power control apparatus comprising:

a first transmitter branch to which one of the first communication signal burst and the at least the second communication signal burst is applied, said first transmitter branch for transmitting the signal burst received thereat at a first selected power level to the first remote station during a first time slot of a TDMA frame; and at least a second transmitter branch to which at least one of the first communication signal burst and the at least the second communication signal burst is applied, said second transmitter branch for transmitting the communication signal burst received thereat at a second selected power level different from the first power level, the communication signal burst transmitted by said second transmitter branch to the second remote station and transmitted for at least a portion of a time slot in the TDMA frame other than the first time slot, said communication signal burst transmitted by said first transmitter branch and by said second transmitter branch being transmitted at the same carrier frequency.

2. The power control apparatus of claim 1 wherein the signal burst applied to said first transmitter branch and the signal burst applied to said second transmitter branch are both formed of the first communication signal burst.

3. The power control apparatus of claim 2 wherein transmission of the first communication signal by said first transmitter branch is offset in time relative to, and overlapping with, transmission of the first communication signal by said second transmitter branch.

4. The power control apparatus of claim 3 wherein the first communication signal comprises a plurality of symbols and wherein the offset in time by which the first communication signal transmitted by said first transmitter branch is offset from the first communication signal transmitted by said second transmitter by an offset less than a selected number of symbols of the plurality of symbols.

5. The power control apparatus of claim 3 further comprising a delay element coupled to receive the first communication signal, said delay element for introducing the offset between the first communication signal transmitted by said first and second signal branches, respectively.

6. The power control apparatus of claim 1 wherein said first transmitter branch further comprises a first amplifier coupled to receive the one of the first communication signal burst and the at least the second communication signal burst, said first amplifier for amplifying the signal burst received thereat to be of the first selected power level.

7. The power control apparatus of claim 1 wherein said second transmitter branch further comprises a second amplifier coupled to receive the one of the first communication signal burst and the at least the second communication signal burst, said second amplifier for amplifying the signal burst received thereat to be of the second selected power level.

8. The power control apparatus of claim 1 wherein said first transmitter branch is allocated for communicating the first communication signal burst to the first remote station during the first time slot, wherein said second transmitter branch is allocated for communicating the second communication signal to the second remote station during a second time slot, and wherein said second communication signal transmitted by said second transmitter branch is transmitted during both the second time slot and a portion of the first time slot.

9. The power control apparatus of claim 8 wherein the portion of the first time slot during which the second communication signal burst is transmitted is of a length of at least great enough to permit the second remote station to extract information therefrom during the first time slot.

10. The power control apparatus of claim 1 wherein the total power level at which the first and second communication signal bursts are transmitted by said first and second transmitter branches, respectively, is substantially constant.

11. The power control apparatus of claim 1 further comprising a power level controller coupled to said first transmitter branch and to said at least the second transmitter branch, said power level controller for independently controlling selection of the first selected power level and the second selected power level at which the communication signal bursts transmitted by said first transmitter branch and said second transmitter branches, respectively, are transmitted.

12. The power control apparatus of claim 1 wherein the transmitting station is operable to transmit a plurality of communication signal bursts to a plurality of remote stations and wherein the first transmitter branch and the at least the second transmitter branch together transmit each of the first communication signal burst and the plurality of communication signal bursts.

13. The power control apparatus of claim 12 further comprising a scheduler for scheduling which of the communication signal bursts are transmitted by said first transmitter branch and said second transmitter branch.

14. The power control apparatus of claim 1 further comprising at least one antenna assembly coupled to at least one of said first transmitter branch and said at least the second transmitter branch, said antenna assembly capable of selectively forming directional antenna beam patterns.

15. The power control apparatus of claim 14 wherein said at least one antenna assembly comprises a first antenna assembly coupled to said first transmitter branch and a second antenna assembly coupled to said second transmitter branch, said first and second antenna assemblies together being operable to create spatial antenna diversity.

16. The power control apparatus of claim 14 wherein said at least one antenna assembly comprises a first antenna assembly coupled to said first transmitter branch and a second antenna assembly coupled to said second transmitter branch, said first and second antenna assemblies together being operable to create polarization antenna diversity.

17. The power control apparatus of claim 16 wherein said first and second antenna assemblies are together further operable to create spatial antenna diversity.

18. The power control apparatus of claim 16 wherein said first and second antenna assemblies are further capable of selectively forming directional antenna beam patterns.

19. The power control apparatus of claim 14 wherein said at least one antenna assembly comprises at least one antenna array formed of a plurality of antenna elements.

20. The power control apparatus of claim 19 wherein said at least one antenna assembly is further operable to create polarization antenna diversity.

21. The power control apparatus of claim 19 wherein said at least one antenna assembly is further operable to create spatial antenna diversity.

22. A method for selectively controlling power levels at which a first communication signal burst and at least a second communication signal burst are communicated by a transmitting station operable in a TDMA communication system at least to communicate the first communication signal burst to a first remote station during a first time slot, and the at least the second communication signal burst to at least a second remote station during at least a second time slot, said method comprising:

applying to a first transmitter branch one of the first communication signal burst and the at least the second communication signal burst and transmitting the signal burst applied thereto at a first selected power level to the first remote station; and applying to at least a second transmitter branch at least one of the first communication signal burst and the at least the second communication signal burst and transmitting the communication signal burst applied thereto at a second selected power level that is different from the first power level to the second remote station using the same carrier frequency as the carrier frequency at which the first communication signal burst is transmitted, the communication signal burst transmitted by the second transmitter branch transmitted for at least a portion of a time slot in a TDMA frame other than the time slot during which the first transmitter branch transmits the signal burst received during said first step of applying to the first transmitter branch.

23. The power control apparatus of claim 1, wherein:
the communication signal burst transmitted by the first transmitter branch is an information-bearing signal burst; and
the communication signal burst transmitted by the second transmitter branch is an information-bearing signal burst.

24. The power control apparatus of claim 1, wherein the communication signal burst transmitted by the first transmitter branch and the communication signal burst transmitted by the second transmitter branch are transmitted in adjacent time slots.

25. The power control apparatus of claim 1, wherein the communication signal burst transmitted by the first transmitter branch and the communication signal burst transmitted by the second transmitter branch are transmitted in the same TDMA frame.

26. The power control apparatus of claim 1, wherein the transmission of the communication signal burst by the first transmitter branch and the transmission of the communication signal burst by the second transmitter branch partially overlap in time.

27. The method of claim 22, wherein
the communication signal burst transmitted by the first transmitter branch is an information-bearing signal burst; and
the communication signal burst transmitted by the second transmitter branch is an information-bearing signal burst.

28. The method of claim 22, wherein the communication signal burst transmitted by the first transmitter branch and the communication signal burst transmitted by the second transmitter branch are transmitted in adjacent time slots.

29. The method of claim 22, wherein the communication signal burst transmitted by the first transmitter branch and the communication signal burst transmitted by the second transmitter branch are transmitted in the same frame.

30. The method of claim 22, wherein the transmission of the communication signal burst by the first transmitter branch and the transmission of the communication signal burst by the second transmitter branch partially overlap in time.

31. The method of claim 22, wherein the communication signal burst transmitted by the first transmitter branch and the communication signal burst transmitted by the second transmitter branch are identical signal bursts.

32. The method of claim 31, wherein the transmission of the communication signal burst transmitted by the second transmitter branch is delayed relative to the transmission of the communication signal burst transmitted by the first transmitter branch.

33. The method of claim 22, wherein said step of transmitting the signal burst applied to the second transmitter branch transmits at least one of the first communication signal burst and the at least the second communication signal burst during both the second time slot and a portion of the first time slot.

34. The method of claim 33, wherein the portion of the first time slot during which the second communication signal burst is transmitted by said second transmitter branch is of a length sufficient to permit the second remote station to extract information from the second communication signal burst during the first time slot.

35. The method of claim 22, further comprising the step of scheduling, prior to said steps of applying, communication signal bursts to be transmitted by the first and second transmitter branches.

36. A transmitting station for transmitting communication signal bursts to remote stations in a TDMA communication system, comprising:

a first transmitter branch capable of transmitting a communication signal burst during a predetermined time slot;

a second transmitter branch capable of transmitting a communication signal burst during a predetermined time slot;

said first transmitter branch scheduled to transmit a communication signal burst at a first transmission power level during a first time slot, said first transmitter branch scheduled to transmit a communication signal burst at a second transmission power level during a period of time that is timewise adjacent said first time slot, wherein said second transmission power level differs from said first transmission power level; and said second transmitter branch scheduled to transmit a communication signal burst at said first transmission power level during said period of time, to permit the remote station assigned to said first time slot to extract information transmitted by said second transmitter branch during said period of time.

37. The apparatus of claim 36, wherein said communication signal bursts transmitted by said first and said second transmitter branches are transmitted using the same carrier frequency.

38. The apparatus of claim 36, wherein said period of time comprises at least a portion of a second time slot.

39. The apparatus of claim 36, wherein said second transmitter branch transmits an information-bearing communication signal burst at said first transmission power level during a portion of said first time slot.

40. The apparatus of claim 36, wherein said second transmitter branch transmits an information-bearing communication signal burst at said second transmission power level during a portion of said period of time.

41. A method for communicating within a TDMA communications system, comprising the steps of:

a first transmitter branch transmitting a communication signal burst at a first transmission power level a first transmitter branch during a first time slot, said first transmission power level being required by a remote station assigned to said first time slot;

the first transmitter branch transmitting a communications signal burst at a second transmission power level during a period of time that is timewise adjacent from said first time slot; and a second transmitter branch transmitting a communication signal burst at said first transmission power level during said period of time so that said remote station can extract information transmitted by said second transmitter branch during said period of time.

42. The method of claim 41, further comprising the step of:

said second transmitter branch transmitting a communication signal burst at said first transmission power level during at least a portion of said first time slot.

43. The method of claim 41, further comprising the step of:

said second transmitter branch transmitting a communication signal burst at said second transmission power level during a portion of said period of time.

44. The method of claim 41, wherein:

said period of time comprises a second time slot that is timewise adjacent said first time slot.

45. The method of claim 41, wherein:

said communication signals bursts transmitted during said steps of transmitting communication signal bursts from said first transmitter branch and said step of transmitting a communication signal burst from said second transmitter branch are transmitted at the same carrier frequency.

* * * * *